Nov. 8, 1932. B. L. BOBROFF 1,886,519
SWITCH FOR SIGNALING SYSTEMS FOR AUTOMOTIVE VEHICLES
Filed Nov. 12, 1930 2 Sheets-Sheet 2

Inventor
Bornett L. Bobroff
By Arthur R. Woolfolk
Attorney

Patented Nov. 8, 1932

1,886,519

UNITED STATES PATENT OFFICE

BORNETT L. BOBROFF, OF RACINE, WISCONSIN

SWITCH FOR SIGNALING SYSTEMS FOR AUTOMOTIVE VEHICLES

Application filed November 12, 1930. Serial No. 495,143.

This invention relates to a signal switch construction for automotive vehicles.

Objects of this invention are to provide a horn button signal switch which is so constructed that the same member serves both as a horn button and signal, or direction switch, and may be mounted centrally of the steering wheel.

Further objects are to provide a combined horn button and signal switch in which a single button is employed both as the horn button and as the operating member for the signal switch, which may be depressed by the hand of the driver to sound the horn, which may be rocked to the right or left to give the appropriate signal, which harmonizes perfectly with the associated parts and in which the signal switch mechanism is completely inclosed or housed without any external manifestation of its presence.

In driving automotive vehicles the driver is frequently required to sound the horn suddenly and he usually depresses the horn button, not with a gentle push, but with a blow of his hand. In signal switch construction it is imperative that the signal be not accidentally or unintentionally given when the operator strikes the horn button, but only when he deliberately rocks the switch to a signal position.

Further objects of this invention are to provide a combined horn button and signal switch which is so constructed that the rocking member is securely releasably held in neutral postion or in either signal position so as to guard against accidental operation when it is only intended to sound the horn, which permits violent and repeated operation of the device without damage or excessive wear, which is of sturdy and rugged construction and which is compact and of relatively small size so that an attractive and pleasing construction results.

In greater detail, objects of this invention are to provide a signal switch in which a body portion carrying the signal switch mechanism is provided and is carried by a surrounding housing shell, in which a base or terminal member is also housed within the shell and preferably provided with a protecting metal base plate held in spaced relation to the terminal members, and in which the shell and body portion are readily slidable downwardly towards the base member, such base member preferably carrying the horn circuit contacts which are closed during this downward motion of the shell and body portion.

Further objects are to provide a construction in which the base member may be completely wired up, and in which the mechanism of the switch is electrically connected to the terminal members of the base by yielding means, such as spring plungers, thereby permitting the removal or replacement of the shell or body portion as a unit without disturbing any wiring.

Further objects are to provide a construction in which the movable and stationary contacts of the signal switch remain the same distance apart when the device is depressed to sound the horn, and in which means are provided for insuring a certain contact between the stationary and movable contacts when the signal switch is operated.

More specifically, objects of this invention are to provide a novel form of contact for signal switches in which the stationary contacts are provided with spring pressed plungers which are depressed and engaged by the movable contact which, itself, may be made yielding if desired, thereby double insuring a good yieldingly pressed contact mechanism which is positive and reliable in operation.

A further specific object of this invention is to provide a novel form of stationary contact in which a movable plunger projects outwardly at one end for engagement with the movable contact and a second plunger projects outwardly at the other end for establishing a connection with a terminal member, a single spring urging said plungers apart.

An embodiment of the invention is shown in the accompanying drawings, in which:—

Figure 1:
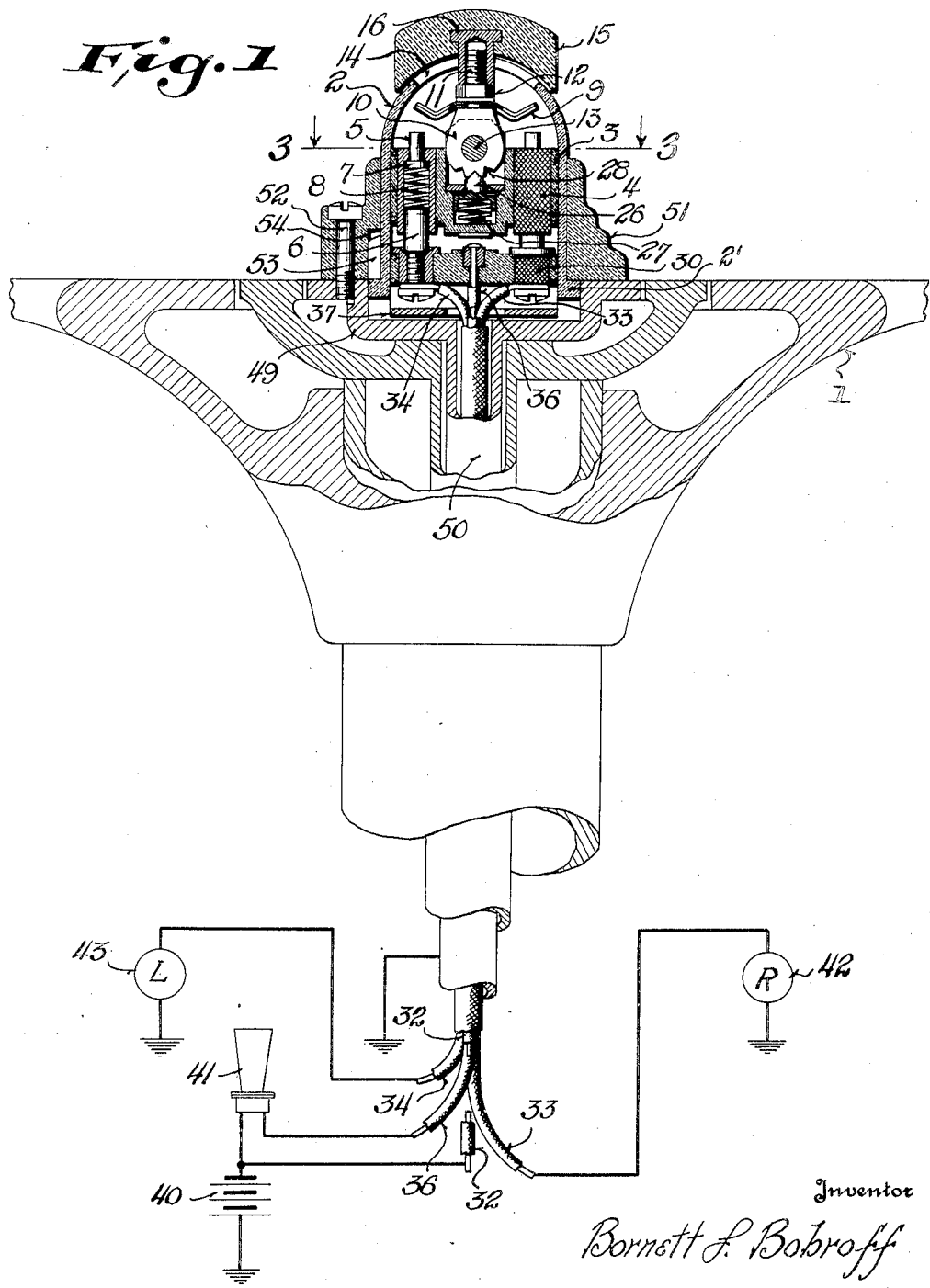
Figure 1 is a vertical sectional view through the device, such view corresponding to a section on the line 1—1 of Figures 3 and 4.

Referring to the drawings it will be seen that an automotive steering wheel has been indicated at 1 and that the combined horn button and signal switch is mounted centrally of the steering wheel.

The device combines a shell 2, which may be formed of bakelite or other insulating material. Within this shell a body portion 3, also of bakelite, is positioned. This body portion carries a pair of stationary contact members, each of which, as may be seen from Figure 1, consists of a shell or sleeve 4 formed of metal and having a rough or knurled exterior. These shells are moulded within the bakelite body portion 3 as shown in Figure 1 and each houses an upper contact switch plunger 5 and a lower connector plunger 6. Preferably the upper plunger is provided with a head 7 which prevents its complete removal upwardly from the metal sleeve 4.

A single spring 8 is carried within each sleeve and bears at opposite ends against the plungers 5 and 6, thereby urging such plungers out. The plunger 5 constitutes a stationary contact member and cooperates with the movable contact member 9 which preferably consists of a plurality of leaves of a somewhat springy metal, such as spring brass or other similar material.

The movable contact member 9 is tightly clamped against a pivoted head 10 which is provided with an upwardly projecting threaded shank 11. The contact member 9 is clamped by means of a clamping nut 12, preferably a lockwasher being provided between the nut and the member 9.

The head 10 and integrally threaded stem 11 constitute a rocking lever which is carried by the pivot 13.

The shell 3 is provided with a transverse slot 14 in its upper dome-shaped end through which the stem 11 projects. A combined horn button and operating member 15 preferably formed of bakelite, is equipped with an internally threaded metal insert 16 which is screwed tightly upon the pin 11.

From the description thus far given it is clear that when the button 15 is rocked laterally that the movable contact member 9 engages one or the other of the spring pressed plungers 5 and 6. These plungers yieldingly maintain contact with the movable contact member 9 when such member is rocked laterally. But if the plungers 5 should stick or fail to operate, nevertheless the yieldingly movable contact member 9 would still yieldingly engage the upper end of the appropriate metal sleeve 4 and thus secure contact.

It is clear, therefore, that means are provided which doubly insure adequate electric contact between one or other of the stationary contact members and the movable contact member whenever such latter member is laterally rocked.

Before proceeding with further description of the combined horn button and switch mechanism, attention is called to the manner in which the body portion 3 is secured to the shell 2. This is most clearly shown in Figure 2, from which it will be seen that a metal strap 17 is provided and is equipped with two upwardly looped spaced portions 18, between which the head 10 of the rock lever is pivoted, the pin 13 being rigidly carried by these upwardly looped spaced portions 18. This strap is apertured at opposite ends and centrally of the horizontal portion of the strap. Internally threaded sleeves 19 are embedded in lugs 20 formed integrally with shell 2. Preferably the members 19 are roughened or knurled exteriorly.

At one side of the apparatus a screw 21 extends through the body portion 3 and through one end of the strap 17 and is screwed into the appropriate member 19.

Figure 2:
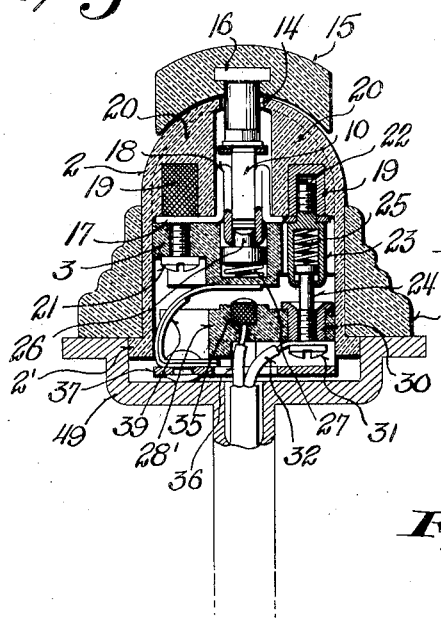
Figure 2 is a sectional view on line 2—2 of Figure 3.

At the other side of the device as viewed in Figure 2, the threaded shank 22 of a connector fitting or plunger fitting 23, passes through the strap 17 and is screwed through the corresponding member 19.

This fitting 23 is provided with a downwardly extending plunger 24 which is urged downwardly by means of the spring 25. The plunger 24 operates to conduct current to the movable contact member 19 from a conductor connected to the battery as the plunger 24 engages a terminal member in a manner hereinafter to appear.

In order to retain the rocking lever in its neutral or in either extreme position, unless it is intentionally and positively moved by the operator, a latching member is provided. This latching member consists of a plunger 26 which is equipped with a V-shaped upper end as shown in Figures 1 and 2. The plunger 26 projects through the lower portion of the strap 17 as shown in Figures 1 and 2 and is provided with an enlarged lower head against which the spring 27 bears, such plunger and spring being carried within a centrally formed recess in the body portion 3 as shown in Figures 1 and 2.

The lever has its head portion 10, see Figure 1, formed with a plurality of V-shaped notches 28 into any of which the plunger 26 is adapted to seat.

It will be seen from Figure 1 that the head of the plunger 26 is in reality a cup-shaped member within which the upper end of the spring 27 seats. This provides additional length for the spring and also aids in maintaining the spring in position.

Figure 3:
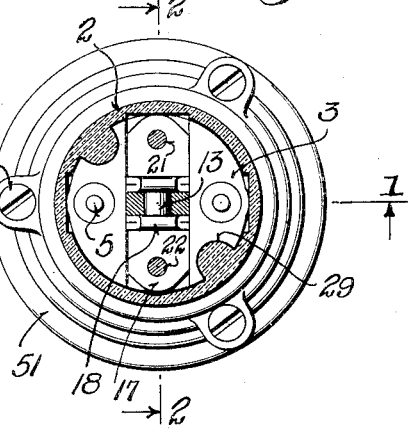
Figure 3 is a sectional view on line 3—3 of Figure 1.

A base member 28 also formed of bakelite is provided and is located within the shell and below and spaced from the body portion 3 as shown in Figures 1 and 2. It is preferable to provide the shell 2 with internally projecting lugs or keys 29 which fit within corresponding slots formed in the body portion and in the base portion, such construction being most clearly seen in Figure 3. This insures correct assembly of the body portion 3 within the shell 2 and also prevents relative rotation of the base 28' with respect to the shell 2.

Figure 4:
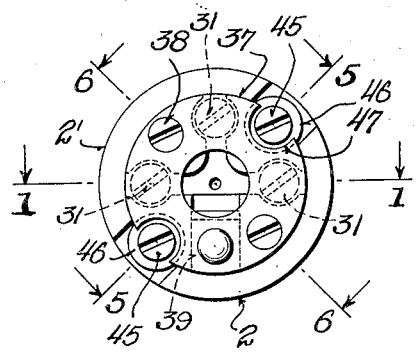
Figure 4 is a bottom plan view of the device removed from the rest of the apparatus.

The base 28' is provided with three terminal members 30, see Figures 1, 2 and 4, which are internally threaded and exteriorly roughened or knurled and moulded in place within the base 28'. These terminal members receive the attaching screws 31 which in turn clamp the conductors 32, 33 and 34 to the appropriate terminal member 30.

Further, the base 28' carries a centrally arranged stationary contact member 35, which is exteriorly roughened or knurled and molded in place within the base. This central contact member is centrally apertured and receives the end of the conductor 36 which is subsequently soldered in place.

A lower metal base plate 37 is rigidly secured to the base member 28 by means of screws 38, see Figure 4. This base plate is spaced below the heads of the screws 31 and is out of contact with such screws. A leaf spring contact member 39 is riveted or otherwise secured to the base plate 37 as shown in Figure 2 and is looped upwardly over the central contact 35 and positioned immediately below and in contact with the body portion 3 as shown in Figure 2.

From the description thus far given it is apparent that the body portion 3 and the rigidly attached shell 2 will be depressed as whenever the driver presses downwardly on the button 15. This downwardly motion of the body portion causes the leaf spring 39 to engage the central contact 35, and in a manner hereinafter to appear, thus closing the horn circuit and sounding the horn. However, if the driver rocks the button 15 laterally to right or left the supply conductor 32 is connected through the plunger 24 and the movable contact member 9 to one or other of the right or left signal contacts, and consequently to conductor 33 or 34 to thus correspondingly connect the right or left signal device such as a signal lamp to the source of supply such as the battery.

It is also apparent that the signals cannot be inadvertently given, when it is merely intended to sound the horn for the reason that the spring pressed latching plunger 26 prevents inadvertent rocking of the button and consequently of the movable contact member 9.

The conductor 32 is connected to the live side of the battery 40 see Figure 1. The other side of the battery is grounded in the usual manner. The conductor 36, leading to the central contact is connected to the horn 41 which is in turn connected to the battery as shown in Figure 1. The conductor 33 is connected to the right signal lamp 42 and the conductor 34 to the left signal lamp 43.

These lamps are preferably arranged in pairs. It is also preferable to arrange a right and left lamp on each side of the vehicle adjacent to the front and a right and left lamp at the rear of the vehicle adjacent to the tail lamp as shown in my co-pending application S. N. 377,821, filed July 12, 1929 for signalling systems for automotive vehicles.

Figure 5:
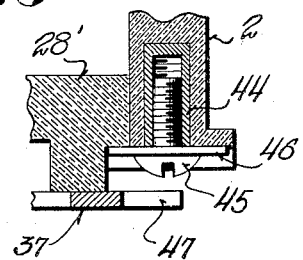
Figure 5 is a fragmentary enlarged detailed section on the line 5—5 of Figure 4.

Turning again to the detailed construction of the apparatus, particularly Figures 4 and 5, it will be seen that the shell 2 is provided with a pair of metal inserts 44, which are internally threaded. These metal inserts receive the screws 45, which in turn hold the washers 46 in place. The washers 46 overlap a portion of the base member 28 as shown in these figures and thus prevent the base member from moving completely outwardly from the device.

Figure 6:
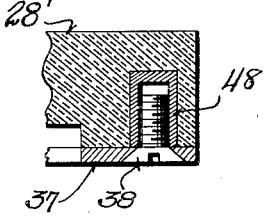
Figure 6 is a fragmentary enlarged sectional view on the line 6—6 of Figure 4.

The base plate 37 is preferably provided with cut-outs 47 to accommodate the heads of the screws 45 as shown in Figure 4. It is also preferable to provide internally threaded metal inserts 48, see Figure 6, which receives the screws 38.

In assembling the device upon the steering mechanism of the automotive vehicle it is preferable to seat the entire device within the upper cup-shaped plate 49 carried by the tubular gas, spark, or light switch control rod 50 as shown in Figure 1. This control rod is, of course, formed of metal and grounded and consequently grounds the base plate 37.

The entire device is thus merely seated within the cup-shaped member 49. It is held in place by means of an adaptor or finishing and retaining ring 51, formed of bakelite, see Figure 1. This ring, is, in turn, held in place by means of screws 52 which extend through such ring and into the cup-shaped upper member 49 of the control rod.

It will be seen that the combined horn button and switch may be assembled as a unit without altering the standard automotive vehicle construction. The ordinary horn button is removed and the switch unit placed in the cup-shaped member. Thereafter the retaining ring 51 is secured in place by means of screws 52.

It is preferable to form a key 53 integrally upon the sleeve 2, see Figure 1 and form a key-way 54 in the ring 51 to prevent relative rotation of shell 2 and ring 51.

It will be seen that the shell 2 and the body portion 3 are held upwardly by means of the downwardly spring pressed plungers 6 and 24, which engage the corresponding terminal members 30, and thus establish these several electric connections for the conductors.

No wiring need pass through the body portion 3 as this construction wholly eliminates such a necessity.

It will be seen that a very simple, compact and readily accessible combined horn button and signal switch mechanism has been provided by this invention. It will be seen further that the device is of sturdy and rugged construction and is substantially fool-proof. From actual practice it has been found that the device is easily assembled, inspected or repaired.

Although the invention has been described in considerable detail, it is to be understood that this description is intended as illustrative rather than limiting as the invention is to be interpreted as claimed.

I claim:

1. In a signal switch, the combination of a movable contact member, and a stationary contact member, said stationary contact member, having a sleeve which can be engaged by said movable contact member and having a spring pressed plunger normally engaged by said movable contact member, when said movable contact member is moved towards said stationary contact member, said movable contact member being adapted for rocking motion a distance to engage said sleeve in the event that said plunger does not function.

2. In a signal switch, the combination of a yielding, movable contact, and a stationary contact member, said stationary contact member having a sleeve which can be engaged by said movable contact member and having a yielding plunger normally engaged by said movable contact member, when said movable contact member is moved towards said stationary contact member, said movable contact member being adapted for rocking motion a distance to engage said sleeve in the event that said plunger does not function.

3. In a signal switch, the combination of a movable contact member, adapted to be rocked from a neutral position to either side position, a metal latching means for temporarily holding said movable contact member in either side position or in neutral position, a pair of side stationary contact members adapted to be selectively engaged by said movable contact member when said movable contact member is rocked, said stationary contacts each comprising a metal body portion adapted to be engaged by said movable contact member, and a metal, spring-pressed plunger adapted to be engaged by said movable contact member, whereby if a plunger should fail to move outwardly, said movable contact member will engage the metal body portion corresponding to such plunger.

4. In a signal switch, the combination of a pair of spaced stationary contacts each comprising a metal sleeve and a plunger carried by said sleeve and spring-pressed outwardly therefrom, a rocking operating member provided with a yielding movable contact for selectively engaging said stationary contacts and adapted to normally engage a plunger and to engage the corresponding sleeve if such plunger fails to project outwardly from such sleeve, and latching means for temporarily latching said operating member in either neutral position or in its rocked position.

5. In a signal switch, the combination of a shell of insulating material, a rocking contact member, pivotally mounted within said shell and having notches, a combined switch and horn button located exteriorly of said shell and connected to said rocking contact member, a metal, spring-pressed, locking plunger, cooperating with said notches to temporarily lock said rocking contact member in any one of several positions, stationary contacts carried within said shell for selective engagement by said rocking contact member, means for slidably holding such shell, means urging said shell upwardly, and horn contacts closed by said shell when said combined switch and horn button is depressed.

6. Contact means for a signal switch comprising a metallic sleeve, a metallic plunger projecting from each end of said sleeve, a spring located within said sleeve and urging said plungers outwardly, one of said plungers having an enlarged flange cooperating with said sleeve for preventing said spring from forcing said plunger completely from said sleeve, the other of said plungers being freely slidable from said sleeve, and a terminal member abutting said last mentioned contact and restraining said last mentioned contact from passing from said sleeve.

7. In a signal switch, the combination of a movable contact member, a stationary contact member, and a terminal connector, said stationary contact member comprising a metallic sleeve, a plunger projecting from one end of said sleeve and adapted to be engaged by said movable contact, a plunger projecting from the other end of said sleeve for engaging said terminal member, and spring means within said sleeve urging said plungers apart.

In testimony whereof, the signature of the inventor is affixed hereto.

BORNETT L. BOBROFF.